Jan. 8, 1935.  E. ENGEL  1,987,435
BRAKE ARRANGEMENT
Filed July 2, 1931   2 Sheets-Sheet 1
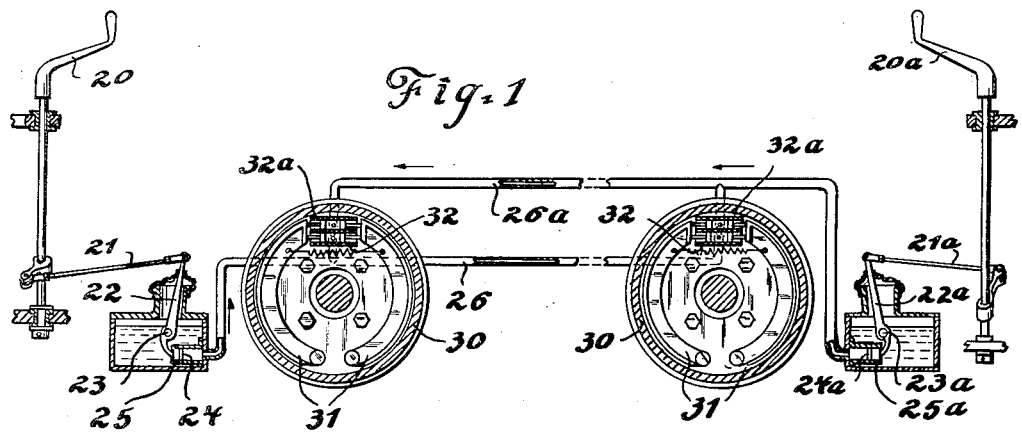
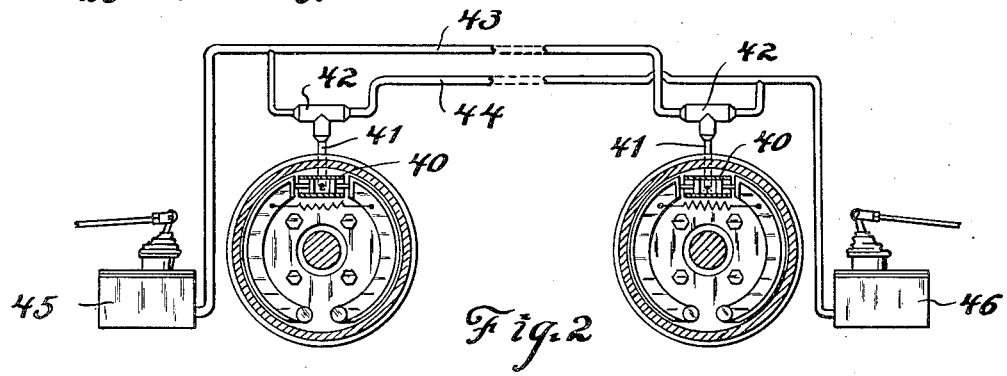
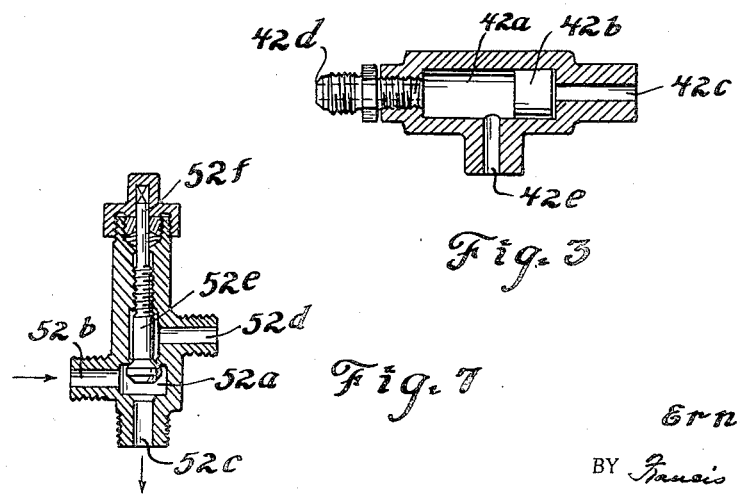
INVENTOR.
Ernst Engel
BY Francis O. Hardesty
ATTORNEY.

Patented Jan. 8, 1935

1,987,435

UNITED STATES PATENT OFFICE 1,987,435

BRAKE ARRANGEMENT

Ernst Engel, Frankfort-on-the-Main, Germany, assignor to Alfred Teves, Frankfort-on-the-Main, Germany Application July 2, 1931, Serial No. 548,447

3 Claims. (Cl. 188—153)

The present invention relates to brake systems for vehicles and particularly to brake systems for such vehicles as street cars or the like in which the brakes are controlled or operated usually from either of two stations. In the case of street cars, for example, the operator may be at either end of the car, depending upon direction of movement, and the controls must therefore be so arranged as to be actuable from either end.

Many forms of brake installations have been devised for this purpose and among them hydraulic or fluid operated brakes, but those hitherto known are open to certain objections, not the least of which is an interdependence of the controls at the spaced control points, which interdependence results in entire loss of braking facilities whenever either of the several controls fails. For example, whenever leakage of a pipe line develops, the entire installation becomes ineffective, and the vehicle is unsafe for use.

The present invention has among its objects the elimination of such difficulties by so arranging the separated controls that failure of one does not cause failure of the other.

Another object is a brake installation having a plurality of control stations and so arranged that any one may be operated independently of another without interference.

Still other objects will readily occur to those skilled in the art upon reference to the following description and the accompanying drawings in which Figure 1 is a more or less diagrammatic sectional view showing one form of the system.

Figure 2 is a similar view showing a modified form.

Figure 3 is a sectional view of the automatic valve used in the second form.

Figure 7 is a section of one of the hand valves used in several of the modifications.

Figure 4:
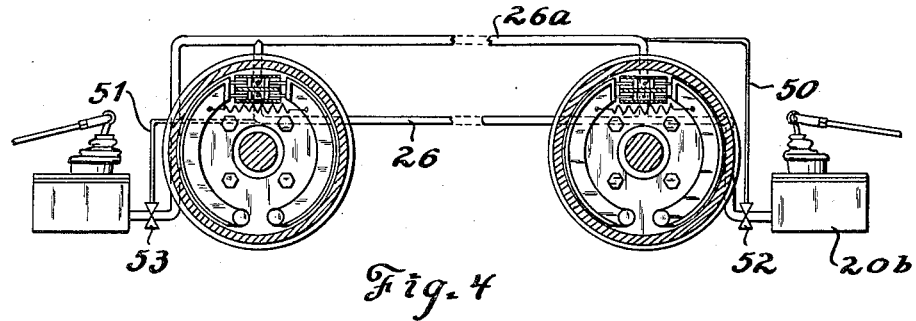
Figures 4, 5 and 6 are views similar to Fig. 1, but showing further modifications.

Referring particularly to Figure 1, the operating handles, one at each end, for example, of a street car, are indicated at 20 and 20a. These may be mounted to rotate in suitable bearings and, in so doing, actuate, through links 21 and 21a, the levers 22 and 22a which are pivoted at 23 and 23a and have at their lower ends the pistons 24 and 24a slidable in the pressure cylinders 25 and 25a.

These cylinders 25 and 25a which may be designated the "main" pressure cylinders deliver fluid under pressure, each to one of the pipe lines 26 and 26a, and each of the latter delivers the pressure fluid to the brakes of the vehicle.

As shown, these brakes may consist of a conventional drum 30 adapted to coact with a pair of brake shoes 31 carried upon a conventional anchor plate and adapted to be spread apart to contact the drum.

The spreading action in Figure 1 is accomplished by means of cylinders 32 and 32a mounted between the free ends of the shoes 31 and having for each brake a pair of such cylinders, one of which, 32, in each brake being connected to pipe 26 and the other of which, 32a, in each brake is connected to pipe 26a.

By this means it can be readily seen that the brakes may be operated from either handle 20 without reversal of parts, and that, in case of leakage or other trouble in one system, the other will remain operative.

Referring to Figure 2, this shows a form of the invention in which in each brake there is used a single brake cylinder 40 similar to one of those indicated in Figure 1 at 32, or 32a. This cylinder 40 has leading to it a pipe 41 from an automatic two-way valve 42 through the action of which fluid pressure is supplied from the main pressure devices 45 and 46 respectively. It will of course be understood that the devices 45 and 46 may be similar to the corresponding elements of Figure 1.

The valve 42 is shown in section in Figure 3 and consists of a cylinder 42a containing a piston 42b and having at its ends fluid inlets 42c and 42d connected respectively to pipes 44 and 43. From the central portion of the casing leads an outlet 42e connected to pipe 41.

When pressure is applied from pipe 43, for example, the piston 42b moves over to occupy the position shown, cutting off communication with pipe 44 and opening pipe 41 to receive pressure only from pipe 43. When pressure is applied from pipe 44, the piston 42b moves over to the other end and closes the connection with pipe 43.

Figure 4 shows a further modification in which provision is made for emergency operation in case anything goes wrong with one of the pressure lines leading to one pair of brake cylinders. In this figure the installation will be substantially the same as in Figure 1 but in addition there will be a reserve pipe line 50 leading from one of the main pressure cylinders to the pressure line ordinarily operated from the other main pressure cylinder. There will also be a reserve line 51 leading from the other of the main pressure cylinders to the other pipe line in a fashion similar to that of the pipe 50. These pipes will be controlled by the hand-operated valves 52 and 53 so that in case, for example, the pressure line 26 becomes inoperative, this being ordinarily supplied from the main pressure device 20b, the valve 52 will be operated to bypass pressure fluid from 20b thru pipe 50 to the line 26a at the same time cutting off communication with the pipe 26.

The suitable valve for this purpose is shown in Figure 7 and comprises a valve chamber 52a having an inlet 52b and two outlets 52c and 52d. In the chamber 52a there will be a valve member 52e having a threaded stem and a continuation 52f by means of which the valve may be moved to open communication with either 52d or 52c. It will be understood that these outlets are connected with the main pressure line 26 and the reserve line 50 or with the pipes 26a and 51.

Figure 5:
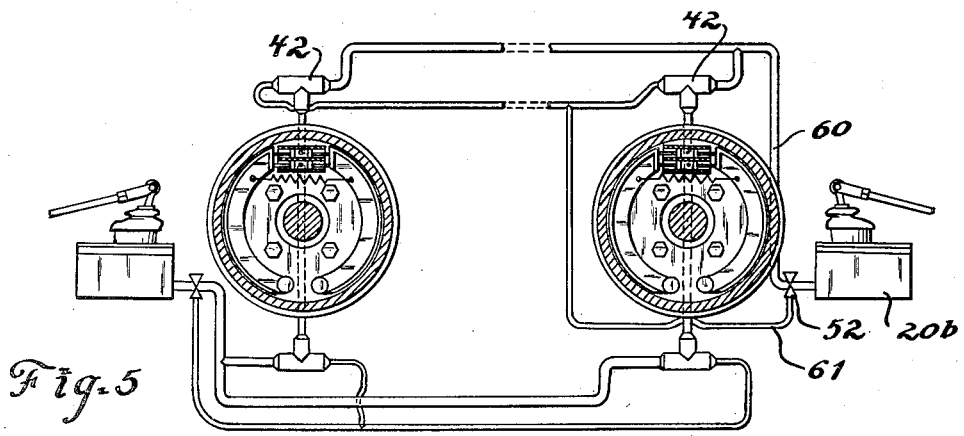

Figure 5 shows a further modification of the brake installation in which both automatic and hand operated valves are used. In this form of the device a main pressure device 20b connects thru a hand operated valve 52 with a main pressure line 60 and a reserve line 61. The main pressure line connects thru automatic valves 42 to the upper ones of the pairs of brake cylinders while the reserve line 61 leads to the other sides of the automatic valves 42. It will readily be seen that thru the operation of the hand valve 52 either of the lines 60 and 61 may be operated at will and the change over by means of the valve 52 permits the automatic change over of the valves 42 to complete the change.

Figure 6:
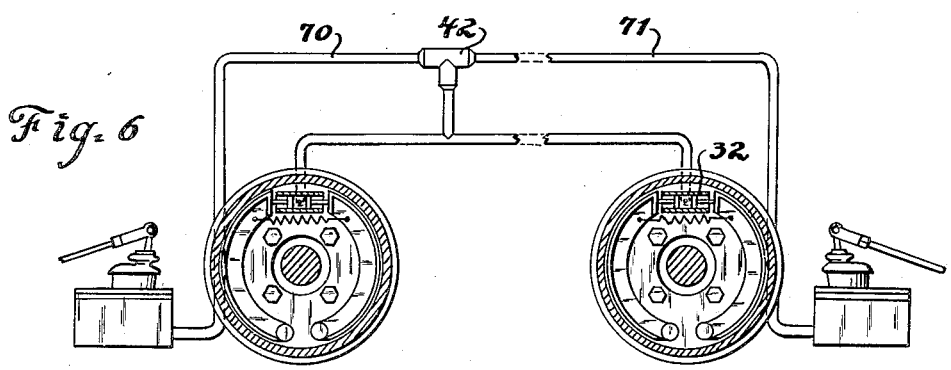

Figure 6 shows a further modification in that only a single brake cylinder 32 is used in each of the brakes and pressure supplied from the outlet side of an automatic valve 42 which in turn is supplied with pressure fluid from either of the pipes 70 and 71 in turn supplied from the two main pressure devices, one at each end of the vehicle.

Now having described the invention and the preferred embodiment thereof, it is to be understood that said invention is to be limited, not to the specific details herein set forth, but only by the scope of the claims which follow.

What I claim is:

1. In a hydraulic braking system for a vehicle, a brake, a pressure cylinder and an operating handle for said cylinder at each end of the vehicle, each brake having two independent brake actuating cylinders, a pipe connecting one pressure cylinder with a brake actuating cylinder of each brake, and a second pipe connecting the other pressure cylinder with the other brake actuating cylinder of each brake.

2. In a hydraulic braking system for wheeled vehicles, brakes on the wheels thereof, each of said brakes having a plurality of actuating cylinders, a plurality of main pressure cylinders actuatable from spaced control positions, a pressure line from each of said main cylinders to one of the brake actuating cylinders at each brake, and means permitting the rerouting of the pressure fluid through another of the pressure lines in the event of leakage of the line normal to a main cylinder.

3. In a hydraulic braking system for wheeled vehicles, a brake on each wheel, actuating cylinders for the brake, two main pressure cylinders each operable independently of the other to cause actuation of said brakes, an independent pressure conduit connecting each of said actuating cylinders and the same pressure cylinders, and means restricting pressure communication between said independent conduits.

ERNST ENGEL.